United States Patent Office 3,554,960
Patented Jan. 12, 1971

3,554,960
CLAY-LOADED ELASTOMERS
Edward F. Cluff and John J. Verbanc, Wilmington, Del., assignors to E. I. du Pont de Nemours and Company, Wilmington, Del., a corporation of Delaware
No Drawing. Filed June 24, 1968, Ser. No. 739,210
Int. Cl. C08d 9/00; C08c 11/14
U.S. Cl. 260—41.5
12 Claims

ABSTRACT OF THE DISCLOSURE

A compounded elastomer comprising essentially a kaolin clay-loaded sulfur curable elastomeric polymer in admixture with at least one dihydroxy ($C_6$–$C_{10}$) aromatic-ring promoter of the mercapto resorcinol and resorcinol disulfide type.

BACKGROUND OF THE INVENTION

This invention relates to new elastomeric compositions possessing good curing behavior and providing cured elastomers with improved properties.

When sulfur curable elastomeric polymers are used in shoe soles and heels, garden hose, wire and cable coatings and similar applications, it is economically desirable to "load" them with clay filler. Unfortunately these filled stocks are usually difficult to cure and generally the cured stocks display a "loggy" and somewhat unsatisfactory balance of properties such as decreased modulus and resilience and undesirably high compression set. This is particularly true of hydrocarbon elastomers such as butyl and EPDM (ethylene/propylene/diene) rubbers which have a low degree of unsaturation. Unlike black loaded stocks such compositions have generally required an unduly long curing time to attain satisfactory stress-strain properties. In some cases, particularly with sulfur curable EPDM polymers, clay loaded vulcanizates have deficiencies in moduli and tensile strength for certain applications.

SUMMARY OF THE INVENTION

It has now been found that sulfur curable elastomers displaying good curing behavior and capable of producing cured products with improved properties can be produced by admixing a kaolin clay-loaded elastomeric polymer with at least one dihydroxy ($C_6$–$C_{10}$) aromatic-ring promoter of the group: (a) a mercapto resorcinol; (b) a bis(1,3-dihydroxy phenyl) disulfide; (c) a poly(resorcinol disulfide); (d) a half ester of (a), (b) or (c); (e) a zinc salt of (a), (b), (c) or (d); (f) a compound corresponding to (a), (b), (c), (d) or (e) in which the benzene ring nucleus is replaced by a naphthalene ring nucleus with the specified substituent groups attached to the same numbered positions; in the amount of about 0.1–5 parts per hundred parts of elastomeric polymer by weight.

DETAILS OF THE INVENTION

The invention is applicable to a wide variety of kaolin clay-loaded rubber stocks. Such stocks upon treatment in accordance with this invention generally produce harder more durable cured products with increased tensile strength, moduli and lower compression set values as compared with similar prior art compositions. Typically the stocks of this invention have Mooney scorch times (250° F.) which are at least comparable to conventional stocks and in some cases are improved (increased) about 2–4 minutes providing more processing safety. When "soft" kaolin clay is utilized the degree of improvement is less than that which is obtained when "hard" clays are used.

The art is well aware of hard and soft kaolin clays and the distinctions between them. The hard clays tend to be finer than soft clays and have very few particles greater than 5 microns in size whereas possibly 9–20% of soft clay particles are larger than 5 microns. A very high proportion (typically 90%) of hard clay particles are smaller than 2 microns whereas about 60–70% of soft clay particles are this small.

The amount of clay employed can be selected to suit the needs of the particular application as will be readily understood in the art. Typical values range from about 50 to about 250 phr. (parts clay per 100 parts of elastomer by weight).

The term "kaolin" is used here as defined in U.S. 3,365,418 and the terms "hard" and "soft" are defined in U.S. 3,345,325 and U.S. 3,355,417. The term "($C_6$–$C_{10}$)-aromatic" refers to the number of carbon atoms in the nucleus of the promoters of this invention.

The invention is applicable to a wide variety of sulfur-curable elastomeric polymers but it is particularly useful with sulfur-curable chain-saturated alpha-olefin hydrocarbon polymers made from at least one alpha-monoolefin and at least one non-conjugated diene. The alpha-monoolefins have the structure $RCH{=}CH_2$ where R is hydrogen or a ($C_1$–$C_{16}$) alkyl. Representative species include ethylene, propylene, butene-1, pentene-1, decene-1 and the like. Straight chain alpha-olefins are preferred.

Representative non-conjugated dienes include aliphatic open chain ($C_6$–$C_{22}$) dienes having only one terminal double bond and having the structure

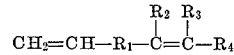

wherein $R_1$ is an alkylene radical, $R_4$ is an alkyl ($C_1$–$C_8$) radical and $R_2$ and $R_3$ are independently selected from the group consisting of hydrogen and alkyl ($C_1$–$C_8$) radicals. Representative of such dienes are 1,4-hexadiene, 1,4-heptadiene, 1,5-heptadiene and the corresponding alkyl substituted dienes such as 4-methyl-1,4-hexadiene, 5-methyl-1,4-hexadiene, 4,5-dimethyl-1,4-hexadiene, 6-methyl-1,5-heptadiene, 7-methyl-1,6-octadiene, 11-ethyl-1,11-tridecadiene, etc. Other useful dienes include dicyclopentadiene; 5-alkenyl-2-norbornenes such as 5-(2'-butenyl)-2-norbornene; 5-alkylidene-2-norbornenes such as 5-ethylidene-2-norbornene and 5-methylene-2-norbornene; 2-alkyl-2,5-norbornadienes such as 2-ethyl-2,5-norbornadiene; cyclopentadiene; and 1,5-cyclooctadiene.

Preferred elastomeric polymers are EPDM polymers such as ethylene/propylene/diene terpolymers in which the diene is one of the dienes referred to above. A particularly preferred terpolymer is ethylene/propylene/1,4-hexadiene terpolymer.

Representative EPDM polymers useful in this invention and procedures for making them are disclosed in U.S. Pats. 2,933,480, 3,000,866, 3,063,973, 3,093,620 and 3,093,621. With polymers containing non-conjugated diene units, it is preferred that the polymer contain units of ethylene and at least one other alpha-monoolefin. An ethylene copolymer should contain about 20 to 75 weight percent ethylene monomer units.

In addition to EPDM elastomers, other rubber-like materials can be used. These include natural rubber, butadiene-styrene copolymers, polyurethanes, polybutadienes, isobutylene/isoprene copolymers (butyl rubbers), polychloroprene, cis-polyisoprene and the like. Elastomeric polymers in general are suitable for practicing this invention.

The promoters used in this invention are dihydroxy compounds containing a ($C_6$–$C_{10}$) aromatic ring nucleus (e.g., benzene or naphthalene) and also containing one or more sulfur substituents. The sulfur substituent can be a mercapto (SH) group or a disulfide (—S—S—) group. Dihydroxythiophenols and the corresponding disulfides in which the sulfur substituent is attached to the 4-position are preferred. However, the corresponding naphthalene compounds can be used. Zinc salts and half esters of these compounds and their alkyl substituted derivatives are also suitable and mixtures of any of these compounds can be utilized. The compounds can also contain additional substituent groups which are innocuous (e.g., alkyl) or do not interfere substantially with the usefulness of the compound as a promoter herein. These can be prepared by conventional procedures. Particularly useful promoters are mercapto resorcinols, including 2-, 4-, or 5-mercapto resorcinols, and the bis(1,3-dihydroxy phenyl) disulfides, preferably bis-4(1,3-dihydroxy phenyl) disulfide and the zinc salts and half esters of these compounds. Similar poly(resorcinol disulfides) can also be used. These are prepared by reacting resorcinol with sulfur monochloride in the molar proportions of (1.1–10):1 and preferably about (1.5–3):1. Reactivity seems to be greatest with a molar ratio of resorcinol to $S_2Cl_2$ of about 2:1. The poly(resorcinol disulfides) are mixtures of oligomers which are thought to have the formula

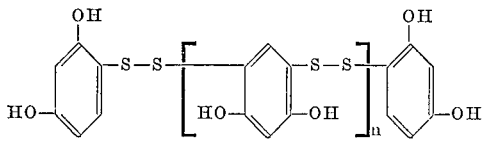

where $n$ is a whole number, usually about 0 for the preferred average composition resulting from a resorcinol-$S_2Cl_2$ reaction in which the molar proportions of the reactants are in the ratio fo 2:1.

The curable compositions of this invention also contain elemental sulfur and a suitable curing accelerator. Such curing systems are familiar to those skilled in the processing of sulfur curable elastomres. It is preferred to use a combination of sulfur, a metal oxide and a vulcanization accelerator. In general about 1 to 3 parts of sulfur are used for every 100 parts by weight of copolymer but larger or smaller concentrations can be used. The optimum amount of sulfur in any case can be readily determined by simple experiments.

Generally zinc oxide is employed, its concentration ranging usually from about 3 to 10 parts by weight. The most active accelerators include thiuram sulfides, dithiocarbamates, 2-mercaptobenzothiazole and their simple derivatives. Of these, the thiuram sulfides and dithiocarbamates are generally preferred because they produce rapid curing without attendant scorching and develop and maintain maximum physical properties even on extended curing cycles. For many uses, however, 2-mercaptobenzothiazole and its derivatives, alone or in combination with thiurams or dithiocarbamates provide adequate acceleration with processing safety. Representative accelerators include: tetramethylthiuram monosulfide, tetramethylthiuram disulfide; tellurium diethyldithiocarbamate, zinc dimethyldithiocarbamate; cadmium dimethyldithiocarbamate; and N,N - diethylthiocarbamyl-2-mercaptobenzothiazole.

The proportion of the promoter compound in the elastomeric composition will depend upon the nature of the compound itself, the hydrocarbon elastomer, the clay, other additives and the particular requirements for the vulcanizate. Those skilled in the art can determine by routine experiments the proper concentration of the promoter to achieve the desired vulconizate properties. Frequently only a very small proportion will be necessary for attaining outstanding results, for example, only about 0.5 part per 100 parts of elastomer. A preferred concentration will usually be 0.5–3 parts. The use of excessively large amounts of promoter can retard the cure in some instances.

In addition to the components already mentioned, the compositions of the present invention can contain other components such as conventional rubber compounding agents including antioxidants, pigments and petroleum oils. The optional additives can be introduced at any time prior to beginning the cure.

The compositions of the present invention can be prepared with the aid of any conventional mixing equipment. Thus the elastomer stock can be compounded on a rubber roll mill or in an internal mixer such as a Banbury mixer or a Struthers-Wells mixer. In order to obtain the maximum benefiit of adding the aromatic cure promoter to the elastomer stocks, it is necessary to insure that this adjuvant is well dispersed in the system. It is frequently preferable to prepare the stocks according to the following procedure; the hydrocarbon elastomer is banded on a rubber roll mill; then the clay, optionally the petroleum oil, and the promoter are introduced. Subsequently, the mixture is passed several times through rolls heated to 250° F. The temperature for this treatment is selected, if possible, to melt the promoter and improve its distribution in the stock. If the promoter is not melted, its distribution tends to be heterogeneous; as a consequence the vulcanizate quality will probably not be the best obtainable with that composition. The stock is then allowed to cool and the accelerators and sulfur are added. If an internal mixer is employed, it is immaterial when the promoter is introduced. The heat build-up during a mixing cycle in an internal mixer is sufficient to raise the stock temperature to about 250° F. so that the additive is melted and dispersed without difficulty.

The curing procedure employed can be modified by those skilled in the art in accordance with the nature of the stock being cured. Various procedures and modifications of sulfur curing are more particularly described in Vulcanization of Elastomers, G. Alligher and I. S. Sjothun, Reinhold Publishing Corporation, New York, 1964.

Vulcanization is accomplished by heating the compounded stock at a temperature ranging from about 100–180° C. for a period of time ranging from about 2 to 30 minutes. Temperatures between about 120 and 170° C. are particularly preferred. The optimum time and temperature will depend somewhat on the nature of the stock, its thickness and the ultimate properties desired. For example, EPDM copolymers are generally cured at temperatures between about 130–180° C. Those skilled in the art can determine the best time and temperature by simple empirical experiments. The state of cure is best determined by the value of the modulus at 300% extension at 25° C. and the compression set at elevated temperature (e.g., 70–100° C.).

EXAMPLE 1

Dihydroxythiophenol is prepared according to the procedure of M. Pantlitschko and H. Benger, Monatschefte, 81, 293 (1950).

To a 1-liter 3-necked flask equipped with a stirrer and addition funnel and containing a solution of 22 g. of resorcinol and 156 g. of copper sulfate pentahydrate in 500 ml. of water is added dropwise a solution of 62 g. of ammonium thiocyanate in 100 ml. of water. A black solid forms and the reaction warms slightly. After a short period of stirring the solid turns to a tan color and is removed by filtration. One hundred ml. of 1 M sodium carbonate solution is added to the filtrate and the solid which forms is removed by filtration. The filtrate is subsequently boiled and then cooled to room temperature. The solid precipitate of 6 - hydroxybenzothioxolone which forms is collected and recrystallized from water (weight=5 g., M.P.=160° C., reported M.P.=160° C.).

The 6-hydroxybenzothioxolone product (5 g.) is dissolved in a solution of 4 g. of sodium hydroxide in 50 ml. of water under an atmosphere of nitrogen. After 10 minutes at ambient temperature the solution is made acidic to pH=2 with hydrochloric acid and extracted with ether. The ether layer is dried with solid magnesium sulfate and then evaporated to dryness under reduced pressure after the magnesium sulfate has been removed by filtration.

The residue comprising 2,4-dihydroxythiophenol is a white solid, M.P.=101° C.

*Analysis.*—Found (percent): C, 51.0; H, 4.2; S, 22.2. Calcd. for $C_6H_6O_2S$ (percent): C, 50.7; H, 4.23; S, 22.5.

2,4-dihydroxythiophenol is tested in a standard formulation in comparison with control stocks containing (a) resorcinol in place of the mercaptan and (b) no additive. The stocks are compounded on a rubber roll mill using the following components in the order shown.

|  | A[1] | B[1] | C[2] | D[2] | E[2] |
|---|---|---|---|---|---|
| EPDM elastomer | 100 | 100 | 100 | 100 | 100 |
| Suprex clay | 120 | 120 | 120 | 120 | 120 |
| Flexon 765 [3] | 20 | 20 | 20 | 20 | 20 |
| Zinc oxide | 5 | 5 | 5 | 5 | 5 |
| Stearic acid | 1 | 1 | 1 | 1 | 1 |
| Dihydroxythiophenol | 2 | 2 | | | |
| Resorcinol | | | 2 | 2 | |

[1] Representing the present invention.
[2] Outside of the present invention.
[3] A naphthenic petroleum oil commercially available from Humble Oil and Refining Company as Flexon 765 having the properties described in U.S. Pat. 3,364,155.

All of these compounded stocks are milled at a roll temperature of about 150° C. so that the stock temperature exceeds 110° C. long enough to melt the aromatic additives (1 to 3 minutes). The compounds are allowed to cool and further compounded on a cool mill (20–30° C.) using the following components:

|  | A[1] | B[1] | C[2] | D[2] | E[2] |
|---|---|---|---|---|---|
| Tetramethylthiuram disulfide | 3 | 3 | 3 | 3 | 3 |
| 2-mercaptobenzothiazole | 1 | | 1 | | 1 |
| Sulfur | 2.5 | 2.5 | 2.5 | 2.5 | 2.5 |

[1] Representing the present invention.
[2] Outside of the present invention.

Each stock is cured for 30 minutes in a press at 160° C. The vulcanizates display the following properties at 25° C.

|  | A[1] | B[1] | C[2] | D[2] | E[2] |
|---|---|---|---|---|---|
| $M_{100}$, p.s.i | 800 | 550 | 820 | 500 | 430 |
| $M_{200}$, p.s.i | 1,670 | 1,350 | 1,350 | 850 | 550 |
| $M_{300}$, p.s.i | 2,130 | 1,750 | 1,630 | 1,070 | 650 |
| Tensile, p.s.i | 2,130 | 2,250 | 1,630 | 1,650 | 2,750 |
| $E_B$, percent | 300 | 420 | 300 | 525 | 580 |
| Percent set (tensile) | 17 | 32 | 17 | 50 | 65 |
| Hardness, Shore A | 68 | 66 | 72 | 67 | 67 |
| Compression set (22 hrs./70° C.) | 16 | 19 | 21 | 31 | 39 |

[1] Representing the present invention.
[2] Outside of the present invention.

EXAMPLE 2

A five gallon glass-lined kettle, equipped with stirrer, addition port, reflux condenser and acid scrubber, is charged with 15.1 pounds resorcinol and 1.37 gallons of ethyl acetate and then heated to 60° C. with stirring until the resorcinol dissolves.

A solution of 9.26 pounds sulfur monochloride in 0.68 gallon of ethyl acetate is then added in about one hour. The HCl evolved is absorbed in a gas scrubber. The reaction is maintained at 60±5° C. and is very mildly exothermic.

When the addition is completed, the apparatus is arranged for reduced pressure distillation. Ethyl acetate is removed by distillation up to a pot temperature of 110–115° C. at 30 mm. pressure. The pot residue is cast into enamel-lined pans to cool. The resultant brittle resin is then ground to a fine powder with 0.20 lb. Microcell E and 0.1 lb. of naphthenic light process oil. Microcell E is a finely divided calcium silicate containing:

| | Percent |
|---|---|
| Volatiles | 14 |
| Silica | 54 |
| CaO | 25 |
| Alumina | 3.6 |
| $Fe_2O_3$ | 1.2 |
| MgO | 0.5 |

The resorcinol disulfide product weighs 19.2 lbs.

Resorcinol disulfide is tested at 25° C. in the formulation of Example 1 at the 2 phr. level against a similar composition containing 2 phr. resorcinol mercaptan and against a control containing 2 phr. resorcinol. Mixing and curing conditions are the same as in Example 1.

|  | Resorcinol disulfide | Resorcinol mercaptan | Resorcinol |
|---|---|---|---|
| $M_{100}$ p.s.i | 1,010 | 1,130 | 920 |
| $M_{200}$ p.s.i | 1,690 | 1,780 | 1,460 |
| $M_{300}$ p.s.i | | 2,180 | |
| $T_B$ p.s.i | 1,850 | 2,350 | 1,680 |
| $E_B$ percent | 220 | 330 | 260 |
| Tensile set, percent | 11 | 27 | 17 |
| Hardness, Shore A | 69 | 66 | 68 |
| Compression set (22 hrs./70° C.) | 19 | 18 | 20 |

EXAMPLE 3

Resorcinol disulfide (28.2 g.; 0.108 mole) prepared from resorcinol and sulfur monochloride as in Example 2 (molecular weight=262, percent S=22.2) is dissolved in 19 ml. (0.205 mole) of acetic anhydride. One drop of concentrated sulfuric acid is added and after 15 minutes the solution is poured onto ice. The water is decanted and the viscous, liquid residue is dried in a vacuum oven at 50° C. The dried resin weighs 31.1 g.

*Analysis.*—Found (percent): S, 18.0. Calcd. for $$C_{16}H_{14}O_6S_2$$

(percent): S, 18.4.

The sulfur analysis corresponds to a product in which 55% of the hydroxyl groups are acetylated. The material is compared to the parent resorcinol disulfide in activity in the standard vulcanization formula of Example 1 and found to be equivalent thereto on a molar basis.

What is claimed is:

1. A compounded elastomer comprising essentially a kaolin clay-loaded sulfur curable elastomeric polymer containing sulfur, activator, and accelerator and about 50 to about 250 phr. clay in admixture with at least one dihydroxy ($C_6$–$C_{10}$)-aromatic promoter of the group:
   (a) mercapto resorcinol
   (b) bis(1,3-dihydroxy phenyl)disulfide
   (c) poly(resorcinol disulfide)
   (d) an acetate half ester of (a), (b), or (c)
   (e) a zinc salt of (a), (b), (c), or (d)
   (f) a compound corresponding to (a), (b), (c), (d), or (e) in which the benzene ring nucleus is replaced by a naphthalene ring nucleus with the specified substituent groups attached to the same numbered positions;

in the amount of about 0.1–5 parts per hundred parts of elastomeric polymer by weight.

2. The composition of claim 1 in which the clay comprises essentially hard kaolin clay.

3. The composition of claim 2 in which the promoter comprises essentially mercapto resorcinol.

4. The composition of claim 2 in which the promoter comprises essentially resorcinol disulfide.

5. The composition of claim 2 in which the promoter comprises essentially poly(resorcinol disulfide).

6. The composition of claim 2 in which the promoter comprises essentially a zinc salt of (a), (b), (c) or (d).

7. The cured composition of claim 1.
8. The cured composition of claim 2.
9. The cured composition of claim 3.
10. The cured composition of claim 4.
11. The cured composition of claim 5.
12. The cured composition of claim 6.

References Cited

UNITED STATES PATENTS 2,711,383   6/1955   Ruggeri et al.
3,345,325   10/1967   Martin.

MORRIS LIEBMAN, Primary Examiner

H. H. FLETCHER, Assistant Examiner

U.S. Cl. X.R.

260—33.6, 608, 609